United States Patent
Hershman et al.

(10) Patent No.: US 10,846,438 B2
(45) Date of Patent: Nov. 24, 2020

(54) RPMC FLASH EMULATION

(71) Applicant: NUVOTON TECHNOLOGY CORPORATION, Hsin-chu (TW)

(72) Inventors: Ziv Hershman, Givat Shmuel (IL); Dan Morav, Herzliya (IL); Moshe Alon, Tel-Aviv (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 10 days.

(21) Appl. No.: 16/503,501

(22) Filed: Jul. 4, 2019

(65) Prior Publication Data

US 2019/0325167 A1 Oct. 24, 2019

Related U.S. Application Data

(63) Continuation-in-part of application No. 16/377,211, filed on Apr. 7, 2019, now Pat. No. 10,783,250, which is a continuation-in-part of application No. 14/714,298, filed on May 17, 2015, now Pat. No. 10,303,880.

(60) Provisional application No. 62/028,345, filed on Jul. 24, 2014.

(51) Int. Cl.
    *G06F 21/72* (2013.01)
    *G06F 3/06* (2006.01)
    *H04L 9/32* (2006.01)

(52) U.S. Cl.
    CPC ............ *G06F 21/72* (2013.01); *G06F 3/0604* (2013.01); *G06F 3/0659* (2013.01); *G06F 3/0679* (2013.01); *H04L 9/3242* (2013.01)

(58) Field of Classification Search
    CPC .............................. G06F 21/72; G06F 3/0659
    USPC ............................................................. 726/1
    See application file for complete search history.

(56) References Cited

U.S. PATENT DOCUMENTS

| | | | |
|---|---|---|---|
| 9,405,707 B2 | 8/2016 | Sarangdhar et al. | |
| 9,836,236 B2 | 12/2017 | Shu et al. | |
| 2015/0334114 A1* | 11/2015 | Scarlata | G06F 21/81 713/170 |
| 2015/0348939 A1* | 12/2015 | Hu | G06F 3/0626 711/103 |
| 2016/0381005 A1* | 12/2016 | Vij | G06F 21/57 726/7 |

OTHER PUBLICATIONS

Kursawe et al., "Reconfigurable Physical Unclonable Functions—Enabling technology for tamper-resistant storage", doi: 10.1109/HST.2009.5225058, 2009, pp. 22-29. (Year: 2009).*

(Continued)

*Primary Examiner* — Peter C Shaw
(74) *Attorney, Agent, or Firm* — Kligler & Associates Patent Attorneys Ltd

(57) ABSTRACT

A controller includes a host interface and a processor. The host interface is configured for communicating with a host. The processor is configured to receive from the host, via the host interface, instructions for execution in a Non-Volatile Memory (NVM), to identify among the instructions an instruction, which pertains to a secure monotonic counter and is intended for execution in an NVM having a secure monotonic counter embedded therein, and to execute the identified instruction, and respond to the host responsively to the instruction, instead of the NVM.

14 Claims, 5 Drawing Sheets

(56) References Cited

OTHER PUBLICATIONS

Parno et al., "Memoir: Practical State Continuity for Protected Modules", doi: 10.1109/SP.2011.38, 2011, pp. 379-394. (Year: 2011).*

Intel "Serial Flash Hardening Product External Architecture Specification (EAS)", Document No. 328802-001EN, revision 0.7, pp. 1-24, year 2013.

* cited by examiner

RPMC FLASH EMULATION

CROSS-REFERENCE TO RELATED APPLICATIONS

This application is a Continuation-in-Part of U.S. patent application Ser. No. 16/377,211, filed Apr. 7, 2019, which is a Continuation-In-Part of U.S. patent application Ser. No. 14/714,298, filed May 17, 2015, which claims the benefit of U.S. Provisional Patent Application 62/028,345, filed Jul. 24, 2014. The disclosures of these related applications are incorporated herein by reference.

FIELD OF THE INVENTION

The present invention relates generally to secure computing environments, and particularly to methods and systems for emulation of Flash memories having embedded secure monotonic counters.

BACKGROUND OF THE INVENTION

Personal Computer (PC) platforms typically use serial Flash memory to store non-volatile data, e.g., Basic Input Output System (BIOS) code. In some cases the serial Flash memory also provides persistent storage support for critical functions such as security and power management.

To meet security requirements, Flash devices may comprise one or more Replay Protection Monotonic Counters (RPMC), which, coupled with secret keys and appropriate software, protect the Flash from unauthorized manipulation such as replay attacks.

Various techniques for security using monotonic counters are known in the art. For example, U.S. Pat. No. 9,405,707 describes a system including a Flash memory device including a monotonic counter, and a host device communicatively coupled to the Flash memory device, to: generate authentication credentials; request a value from the monotonic counter included in the Flash memory device using the authentication credentials and a first signature generated with a device key, receive the value from the monotonic counter and the authentication credentials from the flash memory device, send a second signature generated with the device key and a command to increment the monotonic counter to the Flash memory, wherein the Flash memory device is to validate the request for the value from the monotonic counter and the command to increment the monotonic counter with its own key.

SUMMARY OF THE INVENTION

An embodiment of the present invention that is described herein provides a controller including a host interface and a processor. The host interface is configured for communicating with a host. The processor is configured to receive from the host, via the host interface, instructions for execution in a Non-Volatile Memory (NVM), to identify among the instructions an instruction, which pertains to a secure monotonic counter and is intended for execution in an NVM having a secure monotonic counter embedded therein, and to execute the identified instruction, and respond to the host responsively to the instruction, instead of the NVM.

In an embodiment the controller further includes a memory interface, and the processor is configured to communicate, via the memory interface, with an NVM that does not have an embedded secure monotonic counter, and to forward the instructions other than the identified instruction to the NVM for execution. In another embodiment, when executing the identified instruction, the processor is configured to override a Chip-Select (CS) signal, which is asserted by the host for selecting the NVM. In yet another embodiment, the processor is configured to receive the instructions intended to the NVM by intercepting a Chip-Select signal, which is asserted by the host for selecting the NVM.

In some embodiments the processor is configured to execute the identified instruction in conjunction with a Trusted Platform Module (TPM). In an example embodiment, the TPM is integrated in the controller. In an alternative embodiment, the TPM is external to the controller, and the controller further includes a TPM interface for communicating with the TPM. In another embodiment, the TPM is external to the controller and is connected to the host, and the processor is configured to communicate with the TPM via the host interface.

In some embodiments, the identified instruction conforms to a Replay-Protected Monotonic Counter (RPMC) specification, and the processor is configured to execute the identified instruction in accordance with the RPMC specification.

There is additionally provided, in accordance with an embodiment of the present invention, a method including, in a controller, receiving from a host instructions for execution in a Non-Volatile Memory (NVM). An instruction, which pertains to a secure monotonic counter and is intended for execution in a NVM having a secure monotonic counter embedded therein, is identified among the instructions. The identified instruction is executed by the controller instead of the NVM.

The present invention will be more fully understood from the following detailed description of the embodiments thereof, taken together with the drawings in which:

DETAILED DESCRIPTION OF EMBODIMENTS

Overview

Figure 1:
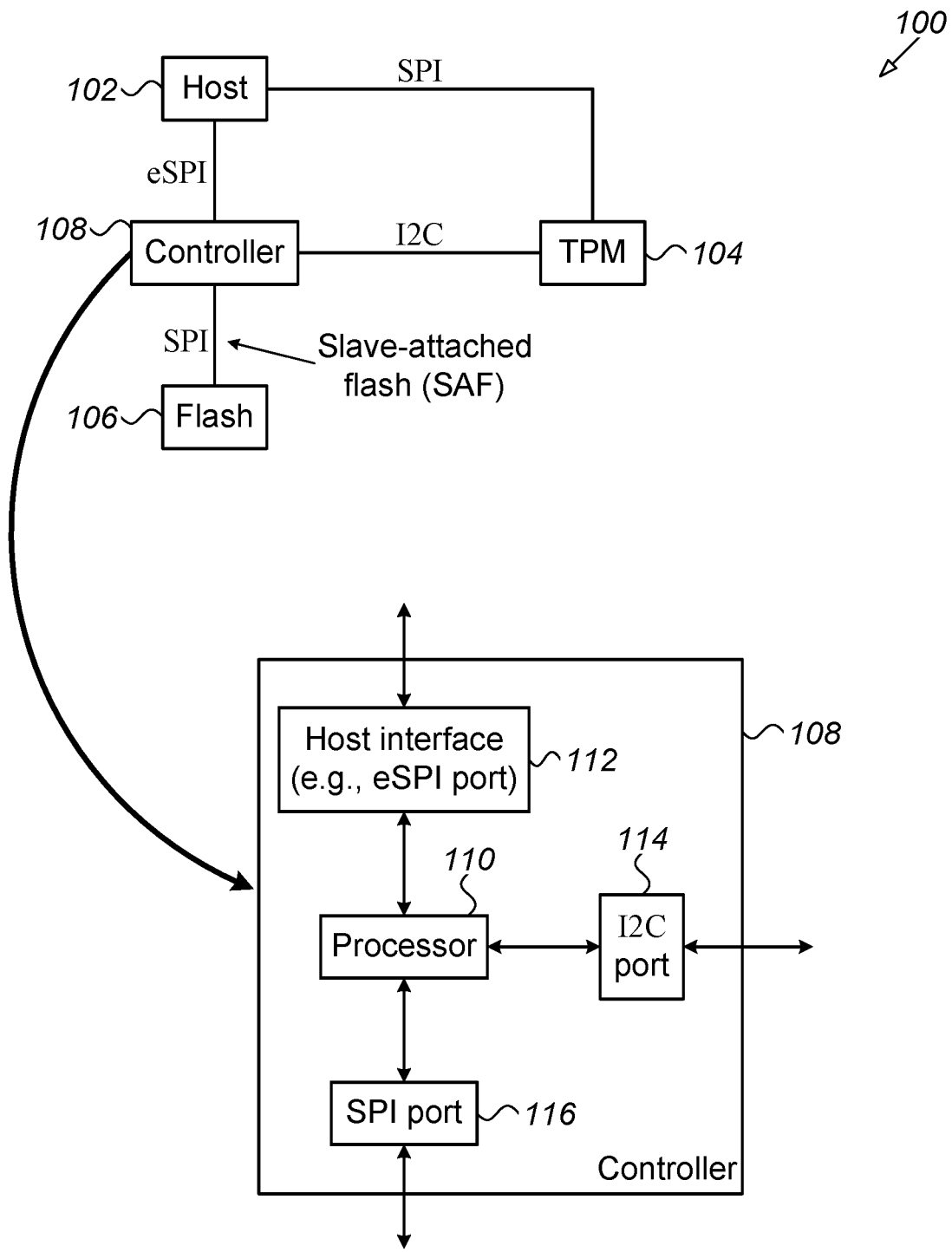
FIG. 1 is a block diagram that schematically illustrates a computing system having a Slave-Attached-Flash (SAF) configuration, which performs Replay-Protected Monotonic Counter (RPMC) Flash emulation in accordance with an embodiment of the present invention.

Non-Volatile memory devices (NVM) such as Flash memories may be used to store boot code or other sensitive information used by computer systems, and, as such, may be sensitive to computer hacking attempts. Conventional NVMs provide very little in terms of protection—e.g., sectors of the NVM may be write-protected; but copying of the NVM or parts thereof or replacing a complete NVM device are still possible. To enhance the protection of NVM, secure monotonic counters that are monotonously modified (e.g., incremented), are defined.

An example of secure monotonic counters is Replay-Protected-Monotonic-Counters (RPMC). RPMC specifications, including architecture and instruction set, are described in an Intel specification entitled "Serial Flash Hardening Product External Architecture Specification (EAS)," revision 0.7, 2013 (Document Number: 328802-001EN), which is incorporated herein by reference.

The RPMC specifications comprise a command to write a 256-bit "Root Key". The root key is stored inside the Flash and is not readable from outside. The root key is programmed only one-time during system manufacturing. A 32-bit monotonic counter is associated with the root key. It is initialized to zero when a valid 256-bit write root key operation is performed regardless of the value of the root key.

Authenticated commands and responses are commands and responses that are signed using the Hash Message Authentication Code key ("HMAC Key"). The signature is verified using HMAC. The HMAC key is stored inside the Flash and is not readable including via test modes. An Authenticated "HMAC key update command" is used to derive a 256-bit HMAC key. The HMAC key is derived from the Root Key and Key data supplied during the command using HMAC-SHA-256. So, this command performs two HMAC-SHA-256 operations—one to derive the HMAC key and one to verify the signature.

Other authenticated commands are used to support Increment and to read the RPMC counters. The RPMC specification requires that a minimum of four counters with associated resources such as root key registers and HMAC key registers are supported. A list of RPMC commands can be found in section 2.1 of the Intel RPMC specification, cited above.

Embodiments of the present invention that are disclosed herein provide methods and systems for emulating a secure NVM having an embedded monotonic counter (e.g., a Flash that supports RPMC), using a non-secure-Flash and a controller. The controller is external to the non-secure-Flash and may comprise, for example, an Embedded Controller (EC), a Baseboard Management Controller (BMC), a "Super I/O" controller, or any other suitable controller. As non-secure-Flash devices are typically simpler (and, hence, less expensive) than secure-Flash devices, a computing system in accordance with embodiments of the present invention may be less costly than computer systems that comprise secure-Flash devices (e.g., RPMC-Flash devices).

Although the description that follows refers mainly to RPMC, the disclosed techniques are applicable to any other suitable type of secure monotonic counter that might be embedded in an NVM. Although the description that follows refers mainly to serial Flash, the disclosed techniques are applicable to any other suitable type of NVM. The reference to serial Flash and RPMC is chosen purely by way of example.

For convenience, we will refer to Flash that supports security functions as a Secure-Flash, and to a Flash that does not support such functions as a non-Secure-Flash. We will further refer to a secure Flash that supports RPMC as RPMC-Flash, and to a Flash that does not support RPMC as non-RPMC-Flash.

In an embodiment, the computing system comprises a controller that communicates with a host, and a non-secure-Flash, e.g., a conventional serial Flash device. The host executes Flash instructions, including instructions that access data that is stored in the Flash, and security-related instructions (e.g. RPMC instructions). The controller operates in conjunction with the non-secure-Flash and emulates a secure Flash toward the host. For example, in a system that comprises a non-secure-Flash and a controller, the host may issue an Increment Monotonic Counter instruction for execution by an RPMC-Flash. The controller may intercept and execute the instruction in lieu of the Flash, transparently to the host.

In some embodiments, the controller comprises a host interface for communicating with the host; and a processor, which receives from the host, via the host interface, instructions for execution in a secure-Flash. The processor identifies security-related Flash instructions (e.g. RPMC instructions), executes at least some of the security-related instructions and responds to the host. Non security-related instructions that the host issues may be executed by a non-secure-Flash.

According to other embodiments of the present invention, the computing system comprises a Non-Secure-Flash device, and the controller comprises a Flash Interface unit that is coupled to the Non-Secure-Flash (the configuration wherein a Flash is coupled to the host through the controller will be referred to as Slave-Attached-Flash (SAF)). The processor receives Flash instructions from the host (via the Host Interface unit). The processor executes the security related instructions and sends the non-security-related instructions for execution in the non-secure-Flash (through the Flash Interface). The processor then responds to the host via the host interface unit.

In some embodiments, the host communicates with the controller over a serial bus, such as Serial Peripheral Interface (SPI) or Extended Serial-Peripheral Interface (eSPI), that comprises, for example a bi-directional data wire, a clock wire, and a plurality of Chip-Select (CS) wires (a single CS wire for each of the devices that are connected to the serial bus). The CS that the host asserts for communicating with a secure Flash is coupled to the controller and relayed to a non-secure-Flash by the controller. The controller relays the CS to the Flash for non-security-related instructions. For security related instructions (e.g. RPMC instructions), the controller will override the CS to the non-secure-Flash.

In other embodiments according to the present invention, a non-secure-Flash is coupled to the host via an SPI or an eSPI bus, and the CS that the host generates for communicating with a secure-Flash is coupled to the CS input of the non-secure-Flash. However, the non-secure-Flash is configured not to respond to security-related instructions (that the non-secure-Flash cannot execute). The controller intercepts the CS that the host sends to the Flash and checks the instruction type. The controller will execute instructions that the Flash cannot execute.

In some embodiments, executing of the security related instruction comprises processing security functions (e.g. security-signing, or verification of a security signature). In an embodiment, the host comprises a Trusted Platform Module (TPM). (TPM is an international standard (ISO/IEC 11889) for a secure crypto-processor—a dedicated microcontroller designed to secure hardware through integrated cryptographic keys.) The controller and the TPM may share a secret, which enables secure communication between the controller and the TPM. The controller serves security-related instructions that the host issues using the TPM as secured NV storage with a secured link.

In some embodiments of the present invention, the controller comprises a TPM, and communication between the controller and the TPM is done on-chip, in a manner which may be inherently secure (or, at least, easier to secure than inter-integrated-circuit communication).

In yet other embodiments, the controller does not comprise interface to a TPM, and communicates with the TPM through the host. To access the TPM, the controller sends a request to the host, and the host relays the request to the TPM. When the TPM responds, the host receives the response and sends it to the controller.

In some embodiments according to the present invention, the security-related instructions that the controller executes in lieu of a secure-Flash comprise the RPMC instructions that are defined in the RPMC specifications referenced herein, or part thereof.

Flash devices that comply with the RPMC specifications referenced above ("RPMC Flash") comprise unique control, status and configuration registers and mechanism. RPMC-Flash devices respond to dedicated RPMC instructions. The controller emulates such RPMC instructions, and may override the CS of the non-RPMC Flash when RPMC instructions are detected. In addition, the controller may comprise a Flash Busy register, which overrides the Flash Busy of the non-secure flash, a Flash-Extended-Status register (to emulate the RPMC's extended status register), and a Serial Flash Discoverable Parameter (SFDP) structure.

The controller may also comprise a cache (i.e., mirror) of some of the Flash registers and some augmentations that are required for the RPMC Flash, and responds on the Flash behalf.

In some embodiments, the Flash may comprise some but not all the RPMC functionality that is defined in the RPMC specifications (for example, the Flash may implement two of the four RPMC counters defined in the specifications), and the controller may emulate the missing functionality.

Thus, embodiments of the present invention that are described herein comprise a controller and a TPM; and provide emulation of secure Flash in systems that do not comprise a secure Flash. In some embodiments the TPM is a separate module, whereas in other embodiments the TPM may be embedded in the controller. In some embodiments the host is coupled directly to the non-secure Flash, and in other embodiments the non-secure Flash is coupled to the host through the controller, for example, in a Slave-Attached-Flash configuration.

As would be appreciated, although the example RPMC specifications described above pertain to specific specification of RPMC in a serial-Flash, embodiments of the present invention are not limited to the specifications, and may adhere to any suitable RPMC specifications, in a serial Flash, a parallel Flash, or any other type of NVM.

In some embodiments, execution of some instructions that the CPU issues may be done jointly by a non-secure Flash and by the controller (for example, when a Flash supports a subset of the required RPMC architecture).

System Description

FIG. 1 is a block diagram that schematically illustrates a computing system 100 with a Slave-Attached-Flash (SAF) configuration, in accordance with a first embodiment of the present invention. The computing system comprises a Host 102, which is configured to execute software instructions, including instructions pertaining to safe access of a secure Flash device (e.g., a Flash device with replay-protection monotonic counters (RPCMs)); a Trusted Platform Module 104, which is configured to implement security functions, a non-secure Flash memory 106 that does not support some or all the instructions that the host may issue to the Flash device; and, a Controller 108, which is configured to emulate Flash security functions that the host issues.

In the example embodiment of FIG. 1 the host communicates with the TPM over a Serial-Protocol-Interface (SPI) bus, and to the controller over an Extended Serial-Protocol Interface (eSPI) bus; the controller communicates with the TPM over an inter-integrated-circuit (I2C) bus, and with the Flash over an SPI bus. As would be appreciated, any other suitable buses, serial or parallel, may be used in alternative embodiments.

In the example embodiment of FIG. 1, the Flash is attached to a controller, and all communications with the Flash are done by the controller. This configuration is referred to herein as Slave-Attached Flash (SAF).

Some of the instructions that the host executes pertain to accessing a Flash memory, including Flash read/write and Flash security functions (for example RPMC instructions). All the instructions which pertain to accessing a Flash memory will be referred to as "Flash Instructions" hereinbelow.

A blow-up of the controller is illustrated at the bottom part of FIG. 1. The controller comprises a Processor 110; a host interface 112, which is configured to communicate between Host 102 and the processor and comprises an Extended Serial-Peripheral-Interface (eSPI) port; an Inter-Integrated Circuit-Bus (I2C) port 114, which is configured to communicate between TPM 104 and the processor; and a Serial-Peripheral-Interface (SPI) port 116, which is configured to communicate between Flash 106 and the processor.

The host executes Flash and non-Flash instructions. To execute a Flash instruction, the host is configured to communicate with a Flash device over the eSPI bus. In the example SAF configuration of FIG. 1, the controller receives and responds to the Flash instructions that the host issues.

In the controller, processor 110 receives the Flash instructions through host-interface 112. The processor may direct some of the instructions to non-secure-Flash 106 for direct execution. The processor will execute other instructions (e.g., instructions that the non-secure-Flash is unable to execute). The execution of other instructions may entail accessing TPM 104 through I2C port 104 and accessing the non-secure Flash.

The processor may conclude some of the Flash instructions by returning any requested data to the host, and/or by returning an indication that instruction execution is completed.

In summary, according to the example embodiment illustrated in FIG. 1, a computing system may comprise a Slave-Attached-Flash which does not support some security functions; the Flash is connected to a host through the controller. The controller communicates with the Flash and with a TPM and executes all Flash instructions either directly or in conjunction with the non-secure Flash and/or the TPM, transparently to the host. Secure Flash functionality is thus achieved in a computing system that may be less expensive than a computing system with a Flash that implements all the Flash instructions.

Figure 2:
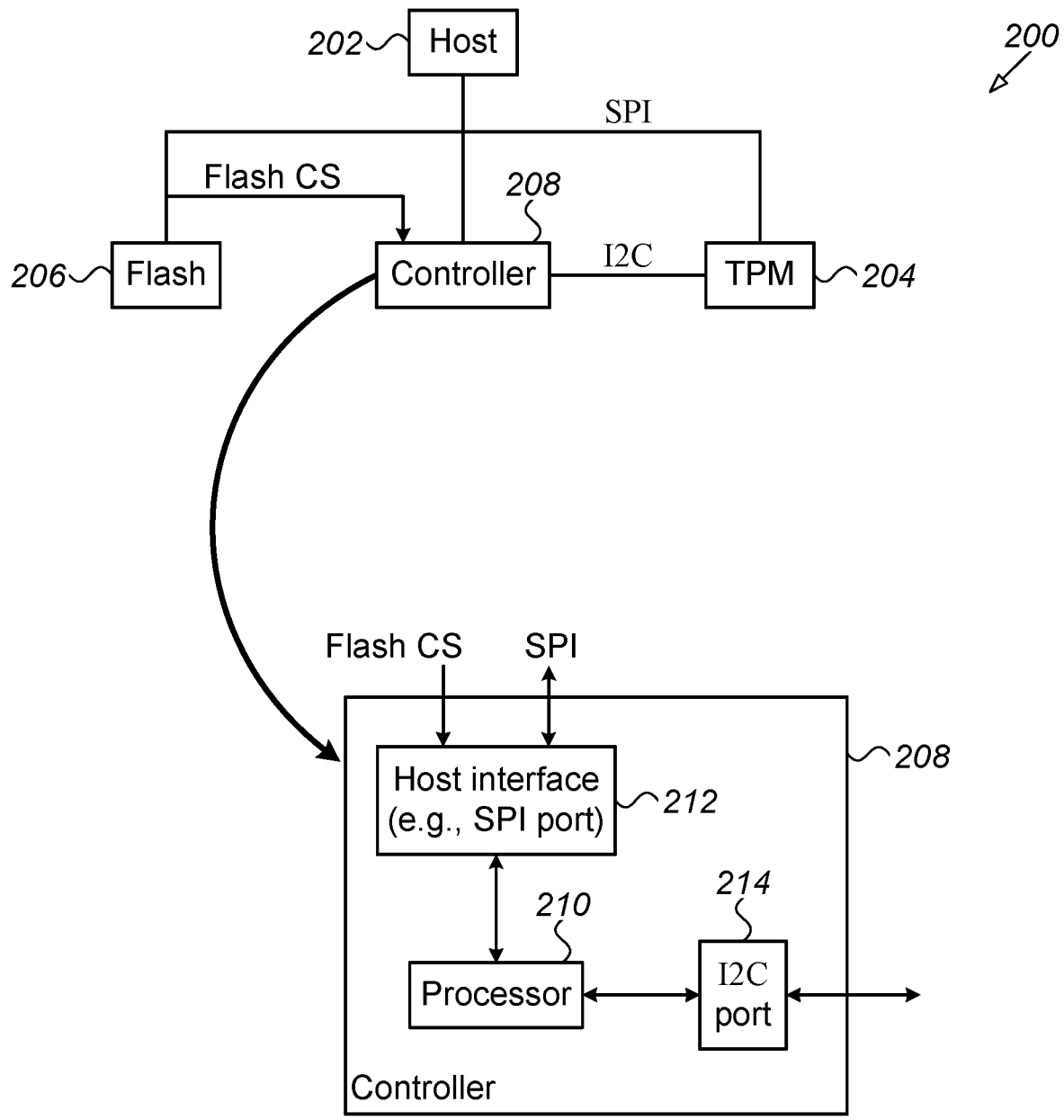
FIG. 2 is a block diagram that schematically illustrates a computing system having a host-attached Flash configuration, which performs RPMC Flash emulation in accordance with another embodiment of the present invention.

FIG. 2 is a block diagram that schematically illustrates a computing system 200 with a host-attached Flash configuration, in accordance with a second embodiment of the present invention. The computing system comprises a Host 202, which is configured to execute software instructions including Flash instructions; a Trusted Platform Module (TPM) 204, which is configured to implement security functions, a Flash 206 that does not support some or all the instructions that the host may issue to the Flash device (will be referred to as non-secure-Flash hereinbelow); and, a Controller 208, which is configured to emulate Flash security functions that the host issues.

In the example embodiment of FIG. 2, the host communicates with the TPM, the controller and the non-secure Flash over an SPI bus. As would be appreciated, any other suitable buses, serial or parallel, may be used in alternative embodiments.

In the example embodiment of FIG. 2, the non-secure Flash receives all Flash communication; however, the Flash is configured to respond only to instructions that the Flash supports. For example, if the host issues an RPMC instruction that the non-secure Flash does not support, the non-secure Flash will ignore the instruction.

A blow-up of the controller is illustrated at the bottom part of FIG. 2. The controller comprises a Processor 210; a host interface 212, which is configured to communicate between Host 202 and the processor; and, an Inter-Integrated Circuit-Bus (I2C) port 214, which is configured to communicate between TPM 204 and the Controller.

To execute a Flash instruction, the host is configured to communicate with a secure-Flash device over the SPI bus. The Chip-Select (CS) line that the host asserts when communicating with a secure Flash, is coupled to the non-secure Flash and to the controller, and when the host issues a security related instruction that the non-secure Flash does not support, the controller takes over and executes the instruction.

In the controller, host interface 212 is coupled to the SPI bus (including to the CS wire described above). The processor receives all Flash instructions from the host through the host interface. If the processor identifies that the received instruction cannot be executed by the non-secure Flash (e.g. an RPMC instruction), the processor will execute the instruction. The execution of the instructions that the non-secure Flash cannot execute may entail accessing TPM 204 through I2C port 104. For example, if some RPMC counters are in the TPM and the host issues a read-RPCM instruction, the processor will access the TPM through the I2C port, and request that the TPM return the values that are stored in the RPCM; the processor will then return the requested data to the host, through host interface 212.

The processor may conclude some of the Flash instructions by returning any requested data to the host, and/or by returning an indication that instruction execution is completed.

In summary, according to the example embodiment illustrated in FIG. 2, a computing system may comprise a non-secure-Flash that is connected to the host through a serial bus, in parallel to a controller. The non-secure Flash executes a subset of the Flash instructions, whereas the controller executes those Flash instructions that the non-secure Flash does not support. Secure Flash functionality is thus achieved in a computing system that may be less expensive than a computing system with a secure-Flash.

Figure 3:
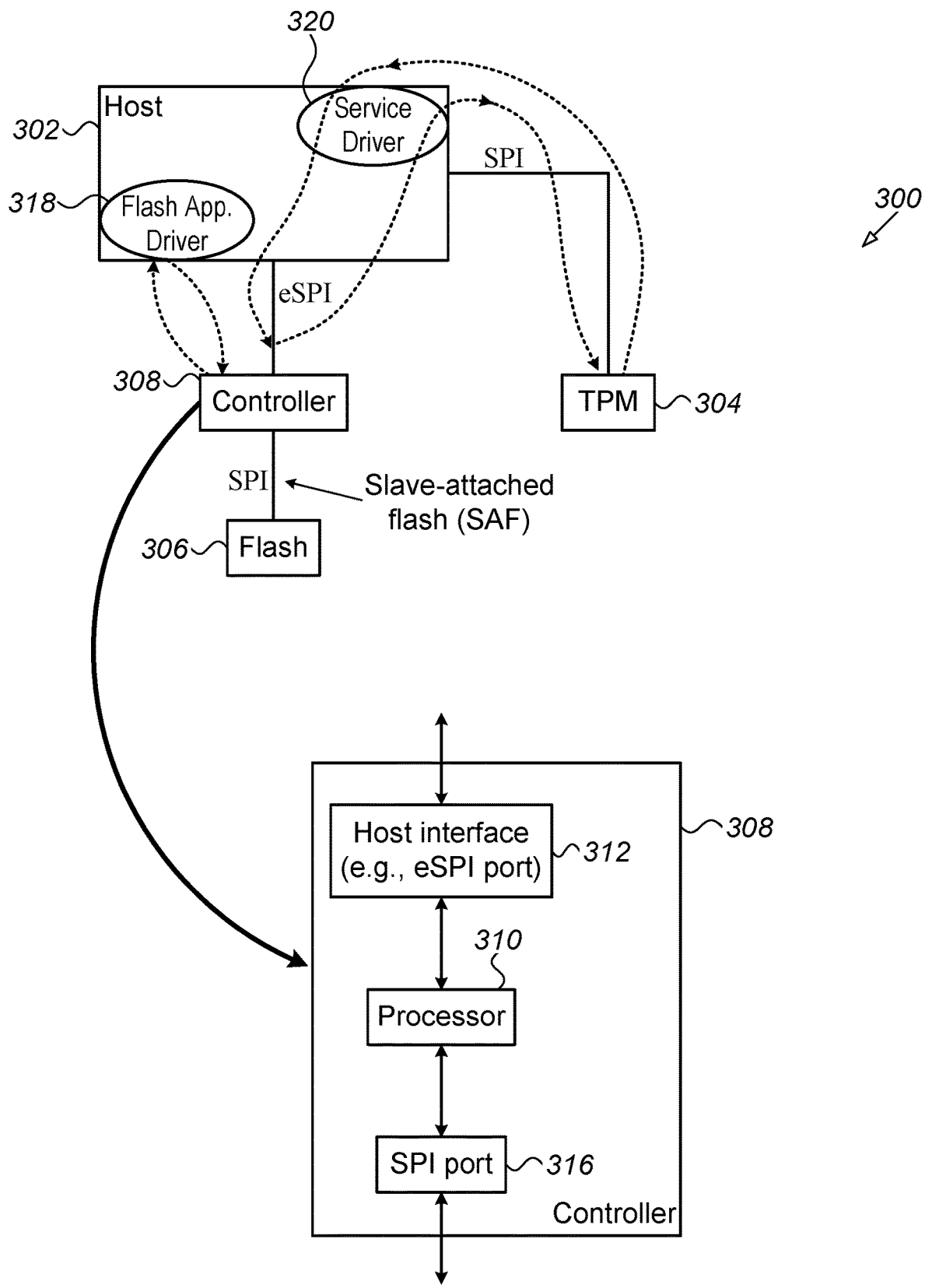
FIG. 3 is a block diagram that schematically illustrates a computing system having a SAF configuration, which performs RPMC Flash emulation in accordance with yet another embodiment of the present invention.

FIG. 3 is a block diagram that schematically illustrates a computing system 300 with a SAF configuration, in accordance with a third embodiment of the present invention. The example embodiment illustrated in FIG. 3 is like the example embodiment of FIG. 1, except that the controller is not coupled directly to the TPM.

The computing system comprises a Host 302, which is configured to execute software instructions including Flash instructions (secure and non-secure); a Trusted Platform Module 304, which is configured to implement security functions, a non-secure Flash memory 306 that does not support some or all the instructions that the host may issue to the Flash device; and, a Controller 308, which is configured to emulate Flash security functions that the host issues.

In the example embodiment of FIG. 3 the host communicates with the TPM over an SPI bus, and to the controller over an eSPI bus; the controller communicates with the Flash over an SPI bus. As would be appreciated, any other suitable buses, serial or parallel, may be used in alternative embodiments. In the example embodiment of FIG. 3, the Flash is attached to a controller, in a SAF configuration.

The host executes Flash instructions, including instructions that non-secure Flash 306 can execute and instructions that the non-secure Flash does not support, which will be executed by the controller.

A blow-up of the controller is illustrated at the bottom part of FIG. 3. The controller comprises a Processor 310; a host interface 312, which is configured to communicate between Host 302 and the processor and comprises an eSPI port; and, an SPI port 316, which is configured to communicate between Flash 306 and the processor.

The host is configured to communicate with a Flash device over the eSPI bus. In the example SAF configuration of FIG. 3, the controller receives and responds to the Flash instructions that the host issues.

In the controller, processor 310 receives the Flash instructions through host-interface 312. The processor may direct some of the instructions to non-secure-Flash 306 for direct execution. The processor will execute other instructions (e.g., instructions that the non-secure-Flash is unable to execute). The execution of other instructions may entail accessing TPM 304 (through the host, as will be described below) and accessing the non-secure Flash.

The processor may conclude some of the Flash instructions by returning any requested data to the host, and/or by returning an indication that instruction execution is completed.

We will now briefly describe example software drivers according to embodiments of the present invention, with reference to FIG. 3. According to the example embodiment illustrated in FIG. 3, at least two drivers are concurrently active in host 302—a Flash Application Driver 318, and a Security Service Driver 320.

Flash Application Driver 318 provides software interface to the Flash device. In the example embodiment of FIG. 3 the Flash application driver communicates with controller 308; the driver, however, may be similar (or identical) to a driver that a host may use in a computing system that comprises a secure Flash (Flash driver 318 may also be used in the example embodiments of FIGS. 1 and 2).

Security Service Driver 320 provides an interface between security services clients and the TPM. In the example embodiment illustrated in FIG. 3, the processor requests TPM services from security service driver 320 through host interface 312. The device driver accesses TPM 304 for service execution, and replies to the processor, through the host interface (in the controller).

In some embodiments, at early pre-boot stages (like ME boot in PC) there is no TPM driver and therefore the TPM cannot be used for some security functions (e.g., monotonic counter functions). The controller, in this case, supports 'retro-active' RPMC during power-up by reporting the monotonic values as stored in the non-secure Flash, and waits for authenticated readings of the monotonic counters from the TPM (keeping the monotonic counter readings in a buffer). If the monotonic counter readings are not authenticated within a predefined period, the controller may reset or otherwise interrupt the host, to alert for a security failure.

In summary, according to the example embodiment illustrated in FIG. 3, a computing system may comprise a Slave-Attached-Flash that does not support some security functions; the Flash is connected to a host through the controller. The controller does not comprise an interface to a TPM; instead, the controller accesses the TPM through a service driver that runs in the host. Secure Flash functionality is thus achieved in a computing system that may be less expensive than a computing system with a Flash that implements all the Flash instructions.

Figure 4:
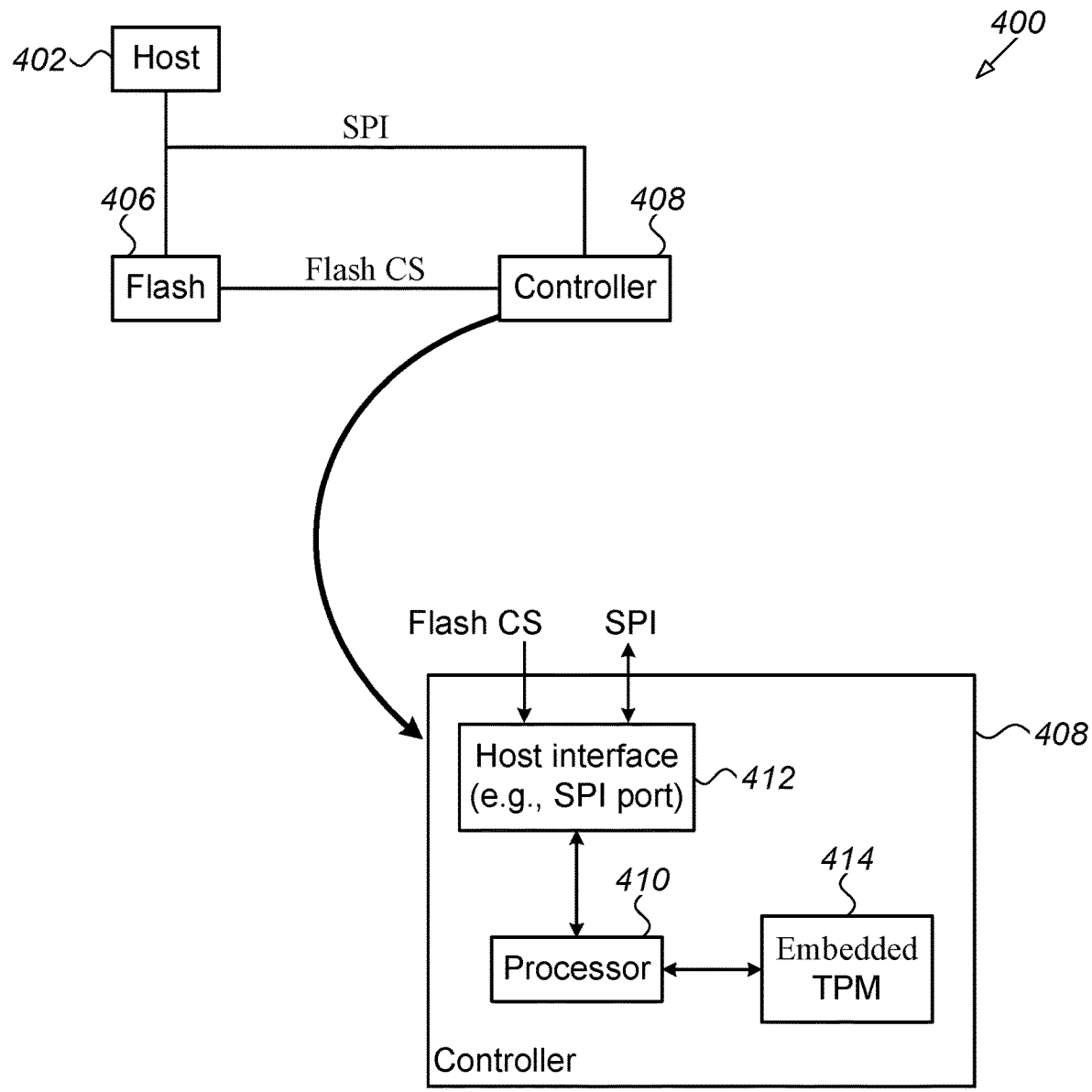
FIG. 4 is a block diagram that schematically illustrates a computing system having a host-attached Flash configuration, which performs RPMC Flash emulation in accordance with an alternative embodiment of the present invention.

FIG. 4 is a block diagram that schematically illustrates a computing 400 system with a host-attached Flash configuration in accordance with a fourth embodiment of the present invention. In this embodiment, the controller comprises a TPM.

The computing system comprises a Host 402, which is configured to execute software instructions including Flash instructions; a non-secure Flash 406; and, a Controller 408, which is configured to emulate Flash security functions that the host issues.

In the example embodiment of FIG. 4, the host communicates with the controller and the non-secure Flash over an SPI bus. As would be appreciated, any other suitable bus, serial or parallel, may be used in alternative embodiments.

In the example embodiment of FIG. 4, the non-secure Flash receives all Flash communication; however, the Flash is configured to respond only to instructions that the Flash supports. For example, if the host issues an RPMC instruction that the non-secure Flash does not support, the non-secure Flash will ignore the instruction.

A blow-up of the controller is illustrated at the bottom part of FIG. 4. The controller comprises a Processor 410; a host interface 412, which is configured to communicate between Host 202 and the processor; and, an embedded-TPM 414, which is configured to implement security functions.

To execute a Flash instruction, the host is configured to communicate with a secure-Flash device over the SPI bus. The Chip-Select (CS) line that the host asserts when communicating with a secure Flash is coupled to the non-secure Flash and to the controller, and when the host issues a security related instruction that the non-secure Flash does not support, the controller takes over and executes the instruction.

In the controller, host interface 412 is coupled to the SPI bus (including to the CS wire described above). The processor receives all Flash instructions from the host through the host interface. If the processor identifies that the received instruction cannot be executed by the non-secure Flash (e.g. an RPMC instruction), the processor will execute the instruction. The execution of the instructions that the non-secure Flash cannot execute may entail accessing embedded TPM 414. For example, if some RPMC counters are in the embedded TPM and the host issues a read-RPCM instruction, the processor will access the embedded TPM, and request that the embedded TPM return the values that are stored in the RPCM; the processor will then return the requested data to the host, through host interface 412.

The processor may conclude some of the Flash instructions by returning any requested data to the host, and/or by returning an indication that instruction execution is completed.

In summary, according to the example embodiment illustrated in FIG. 4, a computing system may comprise a non-secure-Flash that is connected to the host through a serial bus, in parallel to a controller. The non-secure Flash executes a subset of the Flash instructions, whereas the controller executes those Flash instructions that the non-secure Flash does not support. Secure Flash functionality is thus achieved in a computing system that may be less expensive than a computing system with a secure-Flash.

Figure 5:
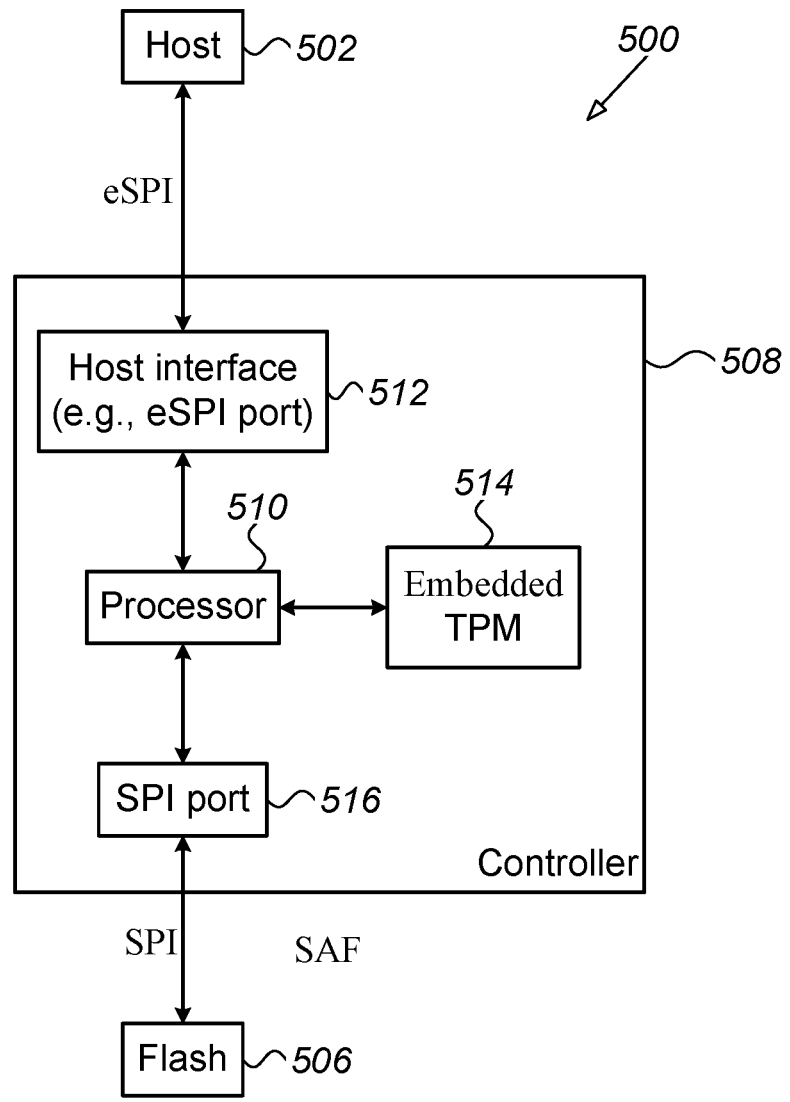
FIG. 5 is a block diagram that schematically illustrates a computing system having a SAF configuration, which performs RPMC Flash emulation in accordance with a fifth embodiment of the present invention.

FIG. 5 is a block diagram that schematically illustrates a computing system 500 with a SAF configuration, in accordance with a fifth embodiment of the present invention. In this embodiment, the controller comprises a TPM, and the non-secure Flash configuration is Slave-Attached-Flash (SAF).

The computing system comprises a Host 502, which is configured to execute software instructions including Flash instructions; a non-secure Flash 506; and, a Controller 508, which is configured to emulate Flash security functions that the host issues.

In the example embodiment of FIG. 5, the host sends Flash instructions including security instructions to the controller. The non-secure Flash is coupled to the controller. The controller comprises a processor 510, a host interface 512, an embedded TPM 514 and an SPI port 516.

In the controller, processor 510 receives the Flash instructions through host-interface 512. The processor may direct some of the instructions to non-secure-Flash 506 for direct execution. The processor will execute other instructions (e.g., instructions that the non-secure-Flash is unable to execute). The execution of other instructions may entail accessing embedded TPM 514 and accessing the non-secure Flash.

The processor concludes some of the Flash instructions by returning any requested data to the host, and/or by returning an indication that instruction execution is completed.

In summary, according to the example embodiment illustrated in FIG. 5, a computing system may comprise a non-secure-Flash that is connected to the host through a controller in a SAF configuration. The controller executes all Flash instructions, secure and non-secure, accessing the attached non-secure Flash and the internal embedded TPM. Secure Flash functionality is thus achieved in a computing system that may be less expensive than a computing system with a secure-Flash.

As would be appreciated, the embodiments of the computing systems that are illustrated in FIGS. 1 through 5 are example embodiments that are cited by way of example. Computing systems in accordance with the disclosed techniques are not limited to the description hereinabove. In alternative embodiments, for example, other types of Non-Volatile memories can be used, and the buses that connect the various components of the system may be different than the buses that are described above. In some embodiments, there may be a plurality of hosts, a plurality of secure Flash devices, and/or a plurality of controllers. In an embodiment, a single controller may be coupled to a plurality of Flash devices and/or a plurality of TPMs.

In some embodiments, the host may issue instructions that atomically read the flash and increment the RPMC. The processor emulates such instructions by accessing the non-secure-Flash for the data and accessing the TPM to increment a corresponding RPMC.

In some embodiments, a single TPM can be used as a general purpose secured NV storage device for other components on board (in addition to its role as TPM serving the host). In an embodiment, the functions of the controller as described above may be implemented in a TPM, and thus a controller will not be needed.

In some non-SAF embodiments, the CS that the host issues to the Flash is coupled to the controller rather than to the Flash, and the CS that the Flash receives is coupled to the controller rather than to the host; the controller generates a CS signal responsive to the CS that the controller receives from the host, and to other Flash access cycles that the controller initiates to execute secure Flash functions.

In some embodiments according to the present invention, the controller may comprise a cache memory for frequently accessed security data (e.g. keys).

Controllers 108, 208, 308, 408 and 508, or elements thereof, may be implemented using any suitable hardware, such as in an Application-Specific Integrated Circuit (ASIC) or Field-Programmable Gate Array (FPGA). In some embodiments, some or all the elements of the controller can be implemented using software, using hardware, or using a combination of hardware and software elements.

Typically, hosts 102, 202, 302, 402 and 502 comprise a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A controller, comprising:
   a host interface for communicating with a host;
   a memory interface; and
   a processor, configured to:
      receive from the host, via the host interface, instructions for execution in a Non-Volatile Memory (NVM);
      identify among the instructions an instruction, which (i) conforms to a Replay-Protected Monotonic Counter (RPMC) specification, (ii) pertains to a secure monotonic counter and (iii) is intended for execution in an NVM having a secure monotonic counter embedded therein;
      execute the identified instruction in accordance with the RPMC specification, and respond to the host responsively to the instruction, instead of the NVM; and
      communicate, via the memory interface, with an NVM that does not have an embedded secure monotonic counter, and to forward the instructions other than the identified instruction to the NVM for execution.

2. The controller according to claim 1, wherein, when executing the identified instruction, the processor is configured to override a Chip-Select (CS) signal, which is asserted by the host for selecting the NVM.

3. The controller according to claim 1, wherein the processor is configured to receive the instructions intended to the NVM by intercepting a Chip-Select signal, which is asserted by the host for selecting the NVM.

4. The controller according to claim 1, wherein the processor is configured to execute the identified instruction in conjunction with a Trusted Platform Module (TPM).

5. The controller according to claim 4, wherein the TPM is integrated in the controller.

6. The controller according to claim 4, wherein the TPM is external to the controller, and wherein the controller further comprises a TPM interface for communicating with the TPM.

7. The controller according to claim 4, wherein the TPM is external to the controller and is connected to the host, and wherein the processor is configured to communicate with the TPM via the host interface.

8. A method, comprising:
   in a controller, receiving from a host instructions for execution in a Non-Volatile Memory (NVM);
   identifying among the instructions an instruction, which (i) conforms to a Replay-Protected Monotonic Counter (RPMC) specification, (ii) pertains to a secure monotonic counter and (iii) is intended for execution in a NVM having a secure monotonic counter embedded therein;
   executing the identified instruction, in accordance with the RPMC specification, by the controller instead of the NVM; and
   communicating with an NVM that does not have an embedded secure monotonic counter, and forwarding the instructions other than the identified instruction to the NVM for execution.

9. The method according to claim 8, wherein executing the identified instruction comprises overriding a Chip-Select (CS) signal, which is asserted by the host for selecting the NVM.

10. The method according to claim 8, wherein receiving the instructions intended to the NVM comprises intercepting a Chip-Select signal, which is asserted by the host for selecting the NVM.

11. The method according to claim 8, wherein executing the identified instruction comprises executing the identified instruction in conjunction with a Trusted Platform Module (TPM).

12. The method according to claim 11, wherein the TPM is integrated in the controller.

13. The method according to claim 11, wherein the TPM is external to the controller, and wherein executing the identified instruction comprises communicating with the TPM.

14. The method according to claim 11, wherein the TPM is external to the controller and is connected to the host, and wherein executing the identified instruction comprises communicating with the TPM via the host interface.

* * * * *